(No Model.) 2 Sheets—Sheet 1.

R. R. HYLAND.
COTTON CHOPPER.

No. 591,972. Patented Oct. 19, 1897.

Witnesses
H. J. Koerth.
V. B. Hillyard.

Inventor
Robert R. Hyland,
By his Attorneys.
C. A. Snow & Co.

(No Model.)  2 Sheets—Sheet 2.
R. R. HYLAND.
COTTON CHOPPER.
No. 591,972. Patented Oct. 19, 1897.
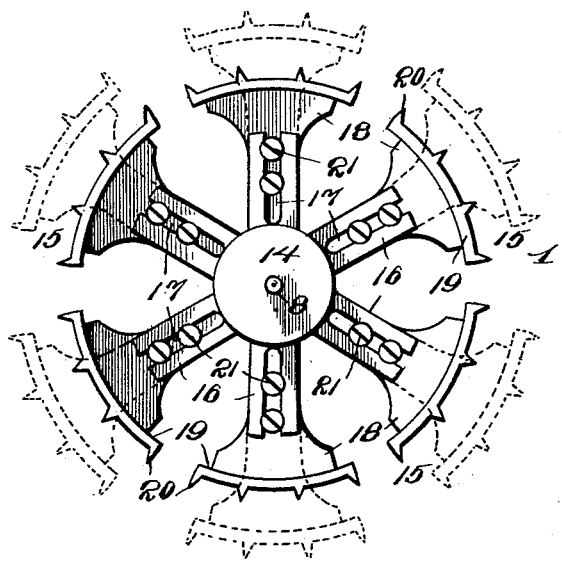
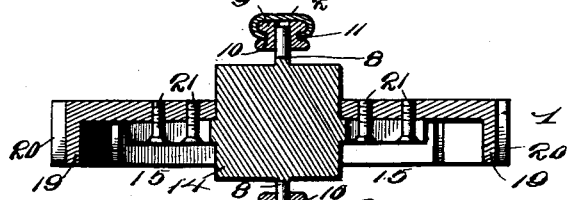
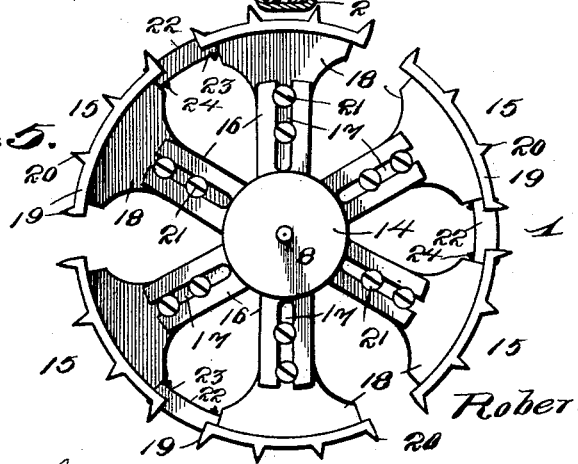
Witnesses
L. J. Koerth
V. B. Hillyard.
Inventor
Robert R. Hyland
By his Attorneys,
C. A. Snow & Co.

UNITED STATES PATENT OFFICE.

ROBERT R. HYLAND, OF ROUND ROCK, TEXAS.

COTTON-CHOPPER.

SPECIFICATION forming part of Letters Patent No. 591,972, dated October 19, 1897.

Application filed August 12, 1896. Serial No. 602,539. (No model.)

*To all whom it may concern:*

Be it known that I, ROBERT R. HYLAND, a citizen of the United States, residing at Round Rock, in the county of Williamson and State of Texas, have invented a new and useful Cotton-Chopper, of which the following is a specification.

The purpose of this invention is the provision of means for thinning the rows of plants in the growing of cotton, and to provide for varying the distance between the plants left standing, and to crush or destroy as many of the plants as desired, so that the proper growth may be maintained to secure a maximum harvest when reaping the product or matured growth.

The improvement consists in combining with a wheel comprising a series of sections capable of radial movement to vary the diameter of the wheel and the distance between the adjacent ends of contiguous sections blocks or filling-pieces to be interposed between adjacent ends of required sections to increase the distance between the hills or the plants to be left standing.

The invention also consists of a chopping-wheel yieldingly and adjustably mounted, whereby obstructions, such as stones or roots, may be passed without disabling or seriously injuring the device, and whereby the latter can be adjusted to any required elevation according to existing conditions.

The improvement also further consists of the novel features and the details of construction whereby the various ends sought to be attained are accomplished, and which are more fully set forth hereinafter, pointed out in the subjoined claims, and illustrated in the accompanying drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 2:
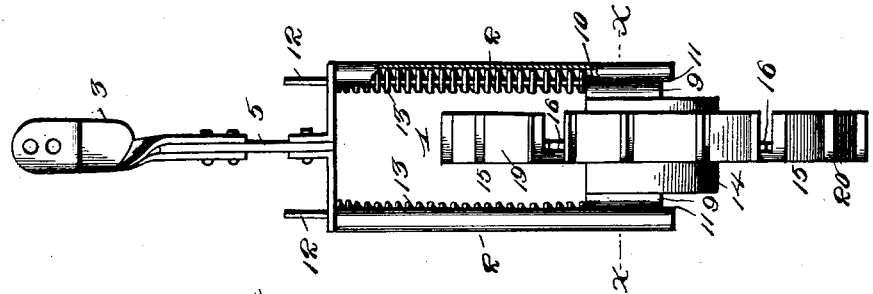
Figure 1:
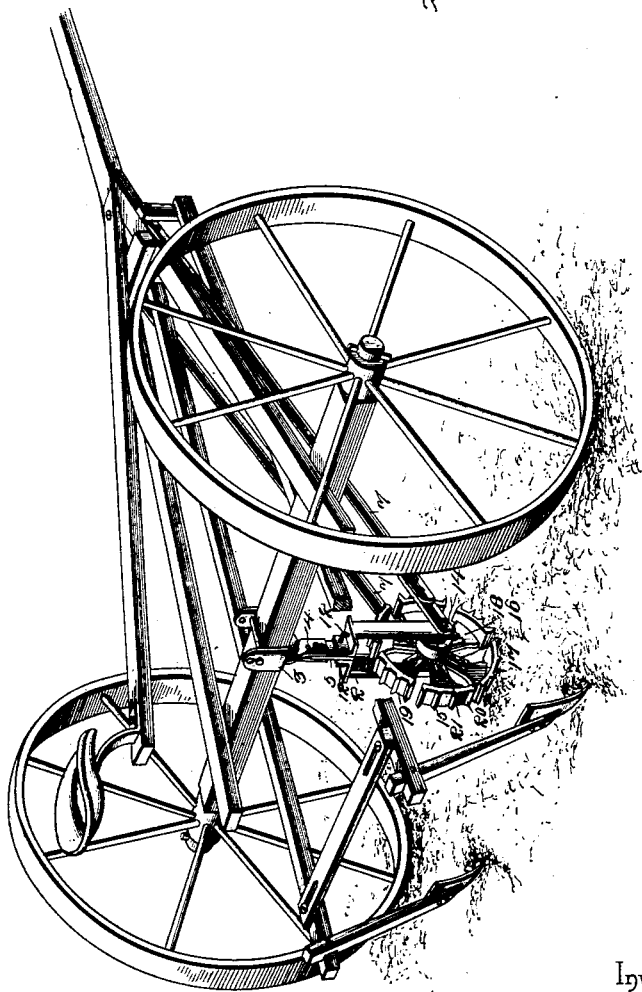

Figure 1 is a perspective view of a cultivator of ordinary construction having the invention applied thereto. Fig. 2 is a rear view of the chopping-wheel and its mountings. Fig. 3 is a horizontal section on the line X X of Fig. 2. Fig. 4 is a side elevation of the chopping-wheel, showing the sections moved outward by dotted lines. Fig. 5 is a side elevation of the chopping-wheel, showing the space between some of the adjacent sections closed by an interposed filling-piece or block.

Corresponding and like parts are referred to in the following description and indicated in the several views of the accompanying drawings by the same reference-characters.

The cultivator illustrated is of ordinary construction and shows the invention in operative relation, it being understood that the chopping-wheel and its mountings are adapted to be used in connection with a cultivator of any desired make or style.

The chopping-wheel 1 is journaled in a forked frame 2 in such a manner as to yield vertically when passing over a stone, root, or other unyielding obstruction, thereby obviating serious injury to the device. A hanger 3 is secured to the axle or other convenient portion of the cultivator, and its lower end is formed with a series of openings 4. The shank or stem 5 of the frame 2 is fitted between the parts or members of the hanger and is provided with openings corresponding to the openings 4, and pins or bolts 6 pass through corresponding openings in the hanger and shank and adjustably connect the latter and frame 2 with the cultivator, thereby making provision for varying the elevation of the chopping-wheel. Braces 7 are interposed between the lower ends of the fork and the cultivator, and are formed of sections which are adjustably connected together, so as to admit of the braces being lengthened and shortened according to the adjustment of the frame 2.

The axle 8, upon which the chopping-wheel is mounted, obtains bearings in blocks 9, which are slidably mounted with respect to the forks of the frame 2, the sides of the blocks being grooved, as shown at 10, to receive the recurved edges 11 of the forks, whereby the blocks are held in place and guided in their vertical movements. Rods 12 have connection with the blocks 9 and extend parallel with the forks and pass through the upper end of the frame 2, and spiral springs 13 are mounted upon the rods 12 and are confined between the blocks 9 and the upper end of the frame 2, and serve to hold the blocks 9 at the lower end of the forks. When the chopping-wheel meets with an unyielding obstruction, it will give and ride over the same by reason of the springs 13 yielding, and after the obstruction is passed the springs will regain their normal position and force the chopping-wheel to its work.

The chopping-wheel comprises a center 14 and radially-slidable sections 15, the center being formed of a hub and radial spokes 16, having slots 17, the latter opening outward through the ends of the spokes. The sections 15 are similarly constructed, and consist of a plate 18 and a rim 19, the latter forming a tread portion and provided on its outer side with transverse cutters or sharpened ribs 20, which are designed to cut the plants and weeds crushed by the wheel when the device is in operation. The plates 18 are placed alongside of the spokes 16 and are adjustably secured to the latter by bolts, screws, or like fastenings 21 in such a manner as to admit of the sections 15 being moved so as to vary the diameter of the wheel as may be desired. From what has been said it will be seen that the spaces between the sections 15 can be varied by moving the said sections to a greater or less distance from the center of the wheel, the distance being increased proportionately as the diameter of the wheel is enlarged by moving the sections outward, and in the same manner decreased as the sections are moved inward.

The space between any two of the movable sections can be closed by interposing between the sections a filling-piece or block 22, the latter having end extensions 23 to bear against the inner sides of the rims 19, to which latter they are secured by bolts or screws 24, passing through the said rims and extensions 23. By this means the distance between the hills can be varied by combining two or more of the movable sections.

The rows of plants are thinned by moving the chopping-wheel thereover, the plants being crushed and chopped by the rim-sections of the chopping-wheel, and those entering the spaces formed between the rim-sections being left standing and forming the hills.

Having thus described the invention, what is claimed as new is—

1. In a cotton-chopper, the combination of a forked frame having the edge portions of the forks recurved, bearing-blocks grooved in their sides to receive the recurved edges of the forks, rods having connection with the blocks and operating through the upper end of the frame, springs mounted upon the rods and interposed between the blocks and the upper end of the frame, and a chopping-wheel mounted in the said blocks, substantially as described for the purpose set forth.

2. In combination with a cultivator, a frame, means for vertically adjustably connecting the frame with the cultivator, sectional braces connecting the lower end of the frame with the front portion of the cultivator and adapted to be lengthened or shortened, a chopping-wheel mounted in bearing-blocks, and springs interposed between the upper portion of the vertically-adjustable frame and the bearing-blocks, substantially as and for the purpose described.

3. In combination, a chopping-wheel for thinning rows of plants, comprising a series of radially-slidable sections, and a block or filling-piece to be interposed and secured between the adjacent ends of contiguous sections, substantially as and for the purpose set forth.

In testimony that I claim the foregoing as my own I have hereto affixed my signature in the presence of two witnesses.

ROBERT R. HYLAND.

Witnesses:
WM. C. PARSONS,
JOSEPH B. MORGAN.